(12) United States Patent
Ouyang et al.

(10) Patent No.: US 12,259,755 B2
(45) Date of Patent: Mar. 25, 2025

(54) FLEXIBLE DISPLAY AND ELECTRONIC DEVICE

(71) Applicant: HUAWEI TECHNOLOGIES CO., LTD., Shenzhen (CN)

(72) Inventors: Shiangruei Ouyang, Shenzhen (CN); Chujung Shih, Shenzhen (CN); Xingtang Rao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 221 days.

(21) Appl. No.: 17/771,978

(22) PCT Filed: Oct. 23, 2020

(86) PCT No.: PCT/CN2020/123299
§ 371 (c)(1),
(2) Date: Apr. 26, 2022

(87) PCT Pub. No.: WO2021/083051
PCT Pub. Date: May 6, 2021

(65) Prior Publication Data
US 2022/0397938 A1      Dec. 15, 2022

(30) Foreign Application Priority Data
Oct. 31, 2019   (CN) .......................... 201911054907.5

(51) Int. Cl.
*G06F 1/16*       (2006.01)
*G02F 1/1333*    (2006.01)
*G02F 1/1335*    (2006.01)

(52) U.S. Cl.
CPC ...... *G06F 1/1652* (2013.01); *G02F 1/133305* (2013.01); *G02F 1/133528* (2013.01); *G06F 1/1616* (2013.01); *G02F 2202/28* (2013.01)

(58) Field of Classification Search
CPC ................ G06F 1/1652; G06F 1/1616; G02F 1/133305; G02F 1/133528; G02F 2202/28; H04M 1/0268; H04M 1/0214; G09F 9/301
See application file for complete search history.

(56) References Cited

U.S. PATENT DOCUMENTS

2003/0134488 A1*  7/2003  Yamazaki ......... G02F 1/133305
                                                              438/455
2015/0233162 A1*  8/2015  Lee ....................... H04M 1/022
                                                              16/223
(Continued)

FOREIGN PATENT DOCUMENTS

CN         105006481 A  * 10/2015  ....... G02F 1/133305
CN         205900544 U       1/2017
(Continued)

*Primary Examiner* — Abhishek M Rathod
*Assistant Examiner* — Keon Kim
(74) *Attorney, Agent, or Firm* — Rimon PC (57) ABSTRACT

A flexible display includes: a first layer structure and a second layer structure, where the first layer structure includes a first structure located at a same layer as the second layer structure and a second structure stacked on the second layer structure; a third layer structure, where the third layer structure covers the second structure and a first part of the first structure; a fourth layer structure, where the fourth layer structure is disposed at a same layer as the third layer structure, and covers a second part of the first structure; and a fifth layer structure, where the fifth layer structure covers the third layer structure and the fourth layer structure, and is fixedly connected to the third layer structure and the fourth layer structure.

19 Claims, 4 Drawing Sheets

(56) References Cited

U.S. PATENT DOCUMENTS

| | | | |
|---|---|---|---|
| 2016/0209958 A1* | 7/2016 | Choi | ................ G06F 3/0418 |
| 2019/0004361 A1 | 1/2019 | Oka et al. | |
| 2020/0006449 A1 | 1/2020 | Yu et al. | |
| 2020/0225396 A1* | 7/2020 | Chen | ................ G02B 5/3033 |

FOREIGN PATENT DOCUMENTS

| | | | | |
|---|---|---|---|---|
| CN | 106547140 A | | 3/2017 | |
| CN | 106711174 A | * | 5/2017 | ............. H01L 27/32 |
| CN | 206210801 U | | 5/2017 | |
| CN | 206863396 U | | 1/2018 | |
| CN | 108831311 A | * | 11/2018 | ............. G09F 9/301 |
| CN | 108877529 A | | 11/2018 | |
| CN | 108899316 A | | 11/2018 | |
| CN | 108962033 A | | 12/2018 | |
| CN | 109036135 A | | 12/2018 | |
| CN | 109065577 A | | 12/2018 | |
| CN | 109616505 A | | 4/2019 | |
| CN | 109699151 A | | 4/2019 | |
| CN | 208738254 U | * | 4/2019 | ........... G02B 5/3041 |
| CN | 208848934 U | | 5/2019 | |
| CN | 110012130 A | | 7/2019 | |
| CN | 110277435 A | | 9/2019 | |
| CN | 110333268 A | | 10/2019 | |
| EP | 3299941 A1 | | 3/2018 | |
| KR | 20140086639 A | * | 7/2014 | ........... G06F 1/1652 |
| KR | 20180047295 A | * | 5/2018 | ......... H01L 27/3246 |
| KR | 20180054386 A | * | 5/2018 | ......... H01L 27/3258 |

* cited by examiner

FLEXIBLE DISPLAY AND ELECTRONIC DEVICE

CROSS-REFERENCE TO RELATED APPLICATIONS

This application is a national stage of International Application No. PCT/CN2020/123299, filed on Oct. 23, 2020, which claims priority to Chinese Patent Application No. 201911054907.5, filed on Oct. 31, 2019. Both of the aforementioned applications are hereby incorporated by reference in their entireties.

TECHNICAL FIELD

This application relates to the field of flexible display technologies, and in particular, to a flexible display and an electronic device.

BACKGROUND

With the development of mobile terminals, users expect larger screens. To balance a size of a mobile terminal with a screen of the mobile terminal, a foldable terminal is developed. Therefore, a flexible display needs to achieve a folding effect together with the terminal. When the foldable terminal is unfolded, the screen is also unfolded. In this case, the flexible display of the terminal is relatively large, to facilitate use of the user. When the terminal is not in use, the terminal is folded, to effectively reduce a volume of the terminal.

During use of the foldable terminal, the flexible display needs to be constantly folded. Because the flexible display includes a plurality of layer structures, the layer structures need to be stably connected. However, in the flexible display in the current technology, after a plurality of times of folding, there may be a risk of detachment between the layer structures. As a result, reliability of the flexible display during use is affected.

SUMMARY

This application provides a flexible display and an electronic device, to improve reliability of the flexible display.

According to a first aspect, a flexible display is provided. The flexible display is applied to an electronic device that can be folded inward. Being folded inward means that the flexible display is not exposed outside the electronic device after the electronic device is folded. The flexible display may be divided into a display area and a non-display area based on a display function. During disposing of the flexible display, the flexible display further includes a first layer structure and a second layer structure that are disposed in the non-display area. The first layer structure and the second layer structure may be different functional layers in the non-display area. During specific disposing, the first layer structure includes two parts: a first structure located at a same layer as the second layer structure and a second structure stacked on the second layer structure. Because the first structure and the second structure are located at different layers, the first structure and the second structure form a step structure. The flexible display further includes a third layer structure and a fourth layer structure. The third layer structure covers the second structure and a first part of the first structure. The fourth layer structure is disposed at a same layer as the third layer structure, and covers a second part of the first structure. A step formed by the first layer structure is filled by using the fourth layer structure and the third layer structure, to achieve a flatting effect, and facilitate disposing of a fifth layer structure. During specific disposing, the fifth layer structure covers the third layer structure and the fourth layer structure, and is separately fixedly connected to the third layer structure and the fourth layer structure. It can be learned from the foregoing description that during disposing of the fifth layer structure, the disposed fourth layer structure and third layer structure cooperate to form a flat area, and the fifth layer structure may be separately fixedly connected to the third layer structure and the fourth layer structure, so that a part that is of the fifth layer structure and that is located in the non-display area can be stably fastened to another structure of the flexible display. When the flexible display is folded inward for a plurality of times, reliable connections between the fifth layer structure and both of the third layer structure and the fourth layer structure alleviate a warpage status of the fifth layer structure after the flexible display is bent for a plurality of times, and improve reliability of the flexible display.

In a specific implementable solution, in a direction from the display area to the non-display area, the fourth layer structure is located on an outer side of the third layer structure. The fourth layer structure is located on the outer side and is connected to the fifth layer structure, to enhance strength of a connection to an edge of the fifth layer structure.

In a specific implementable solution, the fourth layer structure is ring-shaped, and the fourth layer structure is disposed in a manner of surrounding the third layer structure, to enhance strength of a connection to the fifth layer structure.

In a specific implementable solution, the flexible display includes a substrate. The first structure of the first layer structure is disposed on the substrate. The fourth layer structure extends beyond the second part of the first structure to cover the substrate. Therefore, an area of the fourth layer structure is increased, and strength of a connection between the fourth layer structure and the fifth layer structure is enhanced.

In a specific implementable solution, an outer edge area of the fifth layer structure is fixedly connected to an outer edge area of the fourth layer structure, to enhance strength of a connection between edges of the fourth layer structure and the fifth layer structure.

In a specific implementable solution, a side that is of the fourth layer structure and that is away from the substrate is approximately flush with a side that is of the third layer structure and that is away from the substrate, to improve reliability of connections between the fifth layer structure and both of the fourth layer structure and the third layer structure. Being approximately flush means that a height difference between the side that is of the fourth layer structure and that is away from the substrate and the side that is of the third layer structure and that is away from the substrate ranges from 0 μm to 5 μm.

In a specific implementable solution, thickness of the fourth layer structure ranges from 1 μm to 10 μm, to ensure that the step structure formed by the first layer structure can be leveled with the fourth layer structure.

In a specific implementable solution, at least two isolation dams arranged at intervals are disposed on the first structure, and the fourth layer structure covers the at least two isolation dams.

In a specific implementable solution, the flexible display further includes a pressure-sensitive adhesive layer, and the fifth layer structure is separately bonded to the third layer structure and the fourth layer structure through the pressure-sensitive adhesive layer. The pressure-sensitive adhesive layer is bonded to the fourth layer structure, to define an edge area of the fifth layer structure, and improve reliability of the fifth layer structure.

In a specific implementable solution, the fourth layer structure is an adhesive covering layer.

In a specific implementable solution, the first layer structure is a data line layer, the second layer structure is a metal layer, the third layer structure is an encapsulation layer, and the fifth layer structure is a polarizer layer.

According to a second aspect, an electronic device is provided. The electronic device includes a first housing and a second housing that is rotatably connected to the first housing, and further includes the flexible display according to any one of the first aspect and the implementable solutions. The flexible display covers the first housing and the second housing, and the flexible display is separately fixedly connected to the first housing and the second housing. During disposing of a fifth layer structure, a fourth layer structure and a third layer structure that are disposed cooperate to form a flat area, and the fifth layer structure may be separately fixedly connected to the third layer structure and the fourth layer structure, so that a part that is of the fifth layer structure and that is located in the non-display area can be stably fastened to another structure of the flexible display. When the flexible display is folded inward for a plurality of times, reliable connections between the fifth layer structure and both of the third layer structure and the fourth layer structure alleviate a warpage status of the fifth layer structure after the flexible display is bent for a plurality of times, and improve reliability of the flexible display.

In a specific implementable solution, the electronic device is an electronic device that can be folded inward, and the flexible display is a flexible display that can be folded inward, to improve reliability of the flexible display.

DESCRIPTION OF EMBODIMENTS

First, for the convenience of description, a flexible display is briefly referred to as a flexible display, and all flexible displays in the following specification are flexible displays. A flexible display provided in embodiments of this application is applied to a foldable electronic device, and the foldable electronic device is specifically an electronic device that can be folded inward. The electronic device may be different products, for example, a common electronic device such as a mobile phone, a PDA, a notebook computer, or a tablet computer. Each type of electronic device includes a structure shown in FIG. 1: a first housing 200, a rotating shaft mechanism 400, a second housing 300, and a flexible display 100 fastened to the first housing 200 and the second housing 300. Still refer to FIG. 1. The rotating shaft mechanism 400 is separately connected to the first housing 200 and the second housing 300. Rotation of the rotating shaft mechanism 400 enables the first housing 200 and the second housing 300 to rotate relative to each other. The flexible display 100 covers the first housing 200, the second housing 300, and the rotating shaft mechanism 400, and is separately bonded to the first housing 200 and the second housing 300 or connected to the first housing 200 and the second housing 300 in another manner.

Figure 1:
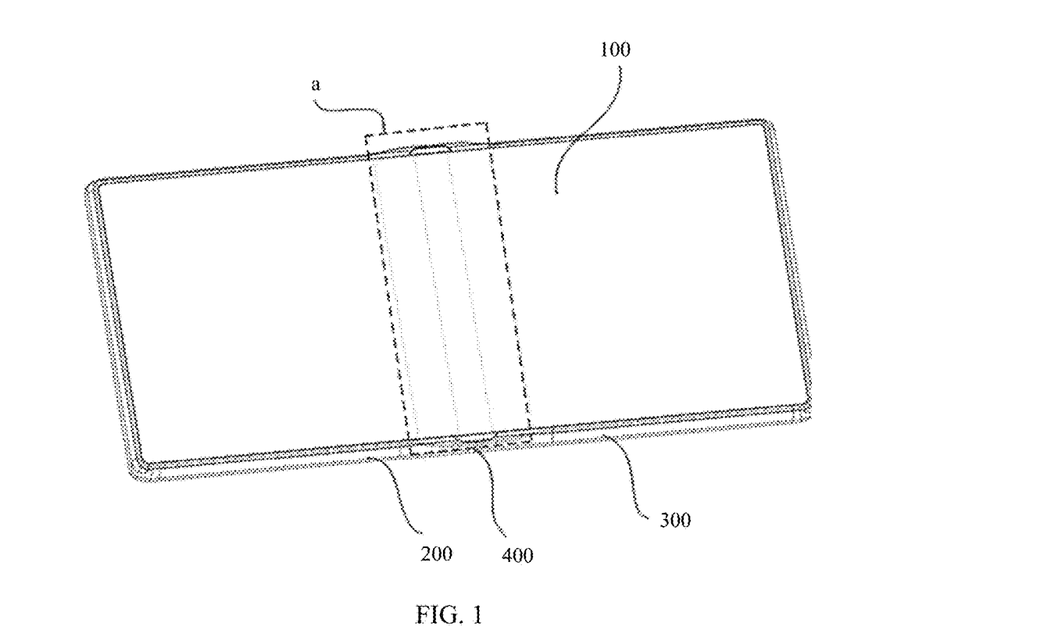
FIG. 1 is a schematic diagram of an unfolded electronic device according to an embodiment of this application.
Figure 2:
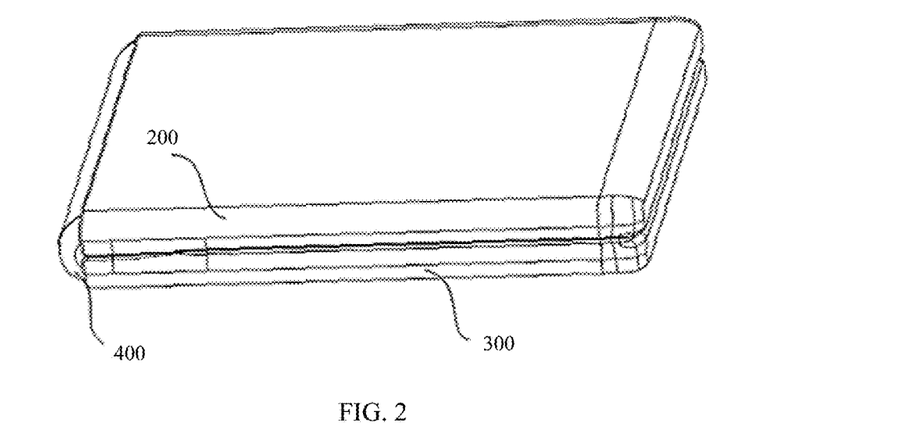
FIG. 2 is a schematic diagram of a folded electronic device according to an embodiment of this application.

During use, the electronic device includes two states: an unfolded state and a folded state. As shown in FIG. 1, when the electronic device is unfolded, the first housing 200 and the second housing 300 are separately expanded on two sides of the rotating shaft mechanism 400. In this case, the flexible display 100 is unfolded. During bending, the first housing 200 and the second housing 300 rotate relative to the rotating shaft mechanism 400, to form a state shown in FIG. 2 after the electronic device is folded. The first housing 200 and the second housing 300 are stacked oppositely, the flexible display (not shown in the figure) is bent along with the first housing 200 and the second housing 300, and the flexible display is not exposed outside the electronic device after the flexible display is folded. However, because the flexible display is formed by stacking a plurality of layer structures inside the flexible display, when the flexible display is folded, an area a of the flexible display in FIG. 1 is bent, and the layers in the flexible display are subjected to different extrusion forces during bending. This easily leads to detachment between some layer structures located on a display side, and reliability of using the flexible display is affected. Therefore, an embodiment of this application provides a flexible display. The following describes the flexible display in detail with reference to accompanying drawings and specific implementations.

Figure 3:
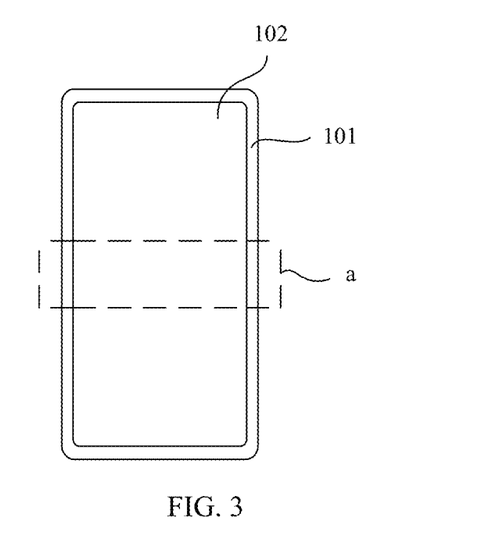
FIG. 3 is a top view of a flexible display according to an embodiment of this application.
Figure 4:
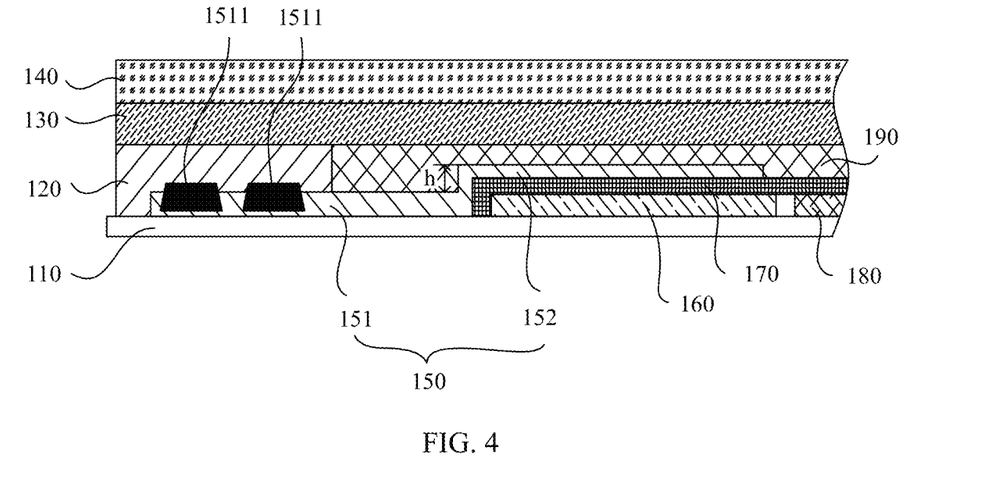
FIG. 4 is a sectional view of a folding area of a flexible display according to an embodiment of this application.

FIG. 3 is a top view of a flexible display according to an embodiment of this application. The flexible display may be divided into a display area 102 and a non-display area 101 based on division of functional areas. The display area 102 is a functional area of the flexible display, and may be configured to display a picture, and the non-display area 101 is configured to block some wiring and component disposing inside the flexible display. Still refer to FIG. 3. During disposing, the display area 102 of the flexible display is located in a middle area of the flexible display, the non-display area 101 is located in a peripheral area of the flexible display, and the non-display area 101 is disposed in a manner of surrounding the display area 102 to wrap around the display area 102. Refer to FIG. 1 together. When the flexible display is bent, an area of the flexible display opposite to the rotating shaft mechanism of the electronic device is bent, for example, the bending area a shown in FIG. 1. An area indicated by a dashed box in FIG. 3 is also the bending area a of the flexible display. To facilitate understanding of the flexible display provided in this embodiment of this application, the following describes an internal structure of the flexible display with reference to FIG. 4. FIG. 4 is a sectional view of a part of the flexible display in the bending area a.

Still refer to FIG. 4. The non-display area 101 of the flexible display provided in this embodiment of this application includes a plurality of layer structures, and the plurality of layer structures are stacked. For ease of description, the flexible display is described by using a placement direction of the flexible display in FIG. 4 as a reference direction. A layer structure at the bottom of the flexible display is a substrate 110, and the substrate 110 is used as a bearing structure of another layer structures. Still refer to FIG. 4. A metal layer 160 and a display layer 180 are disposed on the substrate 110. Refer to FIG. 3 together. The metal layer 160 is disposed in the non-display area 101 of the flexible display, and the display layer 180 is disposed in the display area 102 of the flexible display. It can be learned from FIG. 4 that the metal layer 160 and the display layer 180 are located at a same layer, and heights of the metal layer 160 and the display layer 180 are approximately equal or exactly equal.

Still refer to FIG. 4. A pixel layer 170 is further disposed on the metal layer 160 and the display layer 180, and the pixel layer 170 is configured to cooperate with the display layer 180 for display. Therefore, a main part of the pixel layer 170 is located in the display area 102. In addition, during disposing of the pixel layer 170, the pixel layer 170 extends into the non-display area, so that the pixel layer 170 covers both the metal layer 160 and the display layer 180. Still refer to FIG. 4. The flexible display further includes a data line layer 150. The data line layer 150 is located in the non-display area and is configured to control the display layer 180. During specific disposing of the data line layer 150, as shown in FIG. 4, the data line layer 150 is located at different layers. For ease of description, the data line layer 150 is divided into a first data line layer 151 and a second data line layer 152. The first data line layer 151 is laid flat on the substrate 110, and is disposed at a same layer as the metal layer 160 and the display layer 180. In addition, a height of the first data line layer 151 is approximately equal to or higher than the height of the metal layer 160. The second data line layer 152 is located on the pixel layer 170 and is stacked on the pixel layer 170, and a height of the disposed second data line layer 152 is higher than the height of the first data line layer 151. Therefore, during laying of the data line layer 150, the laid data line layer 150 forms a step structure, and a step height of the step structure is h, in other words, a height difference between the first data line layer 151 and the second data line layer 152 is h.

Still refer to FIG. 4. The flexible display further includes an encapsulation layer 190, and the encapsulation layer 190 is configured to encapsulate the foregoing several layer structures, to form a display module. During specific disposing of the encapsulation layer 190, the encapsulation layer 190 covers a first part of the first data line layer 151, the second data line layer 152, and the pixel layer 170. It can be learned from FIG. 4 that the step structure formed between the second data line layer 152 and the pixel layer 170 and the step structure between the first data line layer 151 and the second data line layer 152 are filled by using the encapsulation layer 190, so that an upper part of the entire module (the placement direction of the flexible display shown in FIG. 4 is used as the reference direction) is flush. It can be learned that the encapsulation layer 190 is not only used as an encapsulation structure, but also plays a flatting role, to facilitate subsequent formation of a layer structure.

Still refer to FIG. 4. When the encapsulation layer 190 is disposed, the encapsulation layer 190 does not encapsulate the first data line layer 151, a second part of the first data line layer 151 is exposed outside the encapsulation layer 190, and a step structure is formed between the exposed second part of the first data line layer 151 and the encapsulation layer 190. In addition, isolation dams 1511 are disposed on the second part of the first data line layer 151 exposed outside the encapsulation layer 190. The isolation dams 1511 may be made of an organic material, for example, plastic or rubber. In FIG. 4, two isolation dams 1511 are shown, and the two isolation dams 1511 are disposed at intervals. However, it should be understood that a quantity of isolation dams 1511 provided in this embodiment of this application is merely an example, and a different quantity of isolation dams 1511 in the flexible display provided in this embodiment of this application may be selected based on a requirement. This is not limited herein.

Still refer to FIG. 4. A polarizer layer 140 is further disposed in the flexible display provided in this embodiment of this application, and the polarizer layer 140 covers the layer structures on the substrate 110. During specific disposing of the polarizer layer 140, the polarizer layer 140 covers the encapsulation layer 190, and the polarizer layer 140 partially extends beyond the encapsulation layer 190, to cover the second part of the first data line layer 151 located outside the encapsulation layer 190. When the electronic device that can be folded inward is folded, because a bending angle of the polarizer layer 140 is less than a bending angle of the encapsulation layer 190, and the encapsulation layer 190 is not bonded to an edge of the polarizer layer 140, detachment between the encapsulation layer 190 and the polarizer layer 140 easily occurs. Therefore, an adhesive covering layer 120 is further disposed on the substrate 110 provided in this embodiment of this application. As shown in FIG. 4, the adhesive covering layer 120 covers the second part of the first data line layer 151, and extends beyond the second part of the first data line layer 151 to cover the substrate 110. Certainly, the adhesive covering layer 120 may alternatively cover only the second part of the first data line layer 151. The disposed adhesive covering layer 120 is adjacent to the encapsulation layer 190. In addition, a height of the disposed adhesive covering layer 120 is the same as or approximately the same as a height of the encapsulation layer 190. Therefore, during specific disposing of the adhesive covering layer 120, different thickness may be set for the adhesive covering layer 120. For example, thickness of the adhesive covering layer 120 ranges from 1 μm to 10 μm. Specifically, different thickness such as 1 μm, 3 μm, 5 μm, 7 μm, 8 μm, and 10 μm may be set for the adhesive covering layer 120, so that a surface of the adhesive covering layer 120 away from the substrate 110 is flush with or is approximately flush with a surface of the encapsulation layer 190 away from the substrate 110.

Still refer to FIG. 4. During disposing of the polarizer layer 140, the polarizer layer 140 is separately bonded to the encapsulation layer 190 and the adhesive covering layer 120 through a pressure-sensitive adhesive layer 130. When the flexible display is folded inward along with the electronic device, because the edge of the polarizer is bonded to the substrate 110 and the first data line layer 151 through the adhesive covering layer 120, the edge of the polarizer layer 140 is also fastened. When the flexible display is bent, because the adhesive covering layer 120 is bonded to the edge of the polarizer layer 140, a force on an edge area (an area corresponding to the adhesive covering layer 120) of the polarizer layer 140 is approximately equal to a force on a middle area (an area corresponding to the encapsulation layer 190) of the polarizer layer 140, so that detachment between layer structures uneasily occurs. However, in the flexible display in the current technology, during disposing of the encapsulation layer, because the part of the first data line layer exposed outside the encapsulation layer does not affect a function of the polarizer, generally, no layer structure is not disposed in this area. As a result, the edge of the polarizer is suspended. When the flexible display in the current technology is folded inward, because the edge of the polarizer is suspended, when the polarizer is folded inward, a stress on the edge of the polarizer is different from a stress on a part of the encapsulation layer. When the stress acts on the pressure-sensitive adhesive layer, the pressure-sensitive adhesive layer is easily detached from the polarizer layer or the encapsulation layer, resulting in detachment between layers.

It can be learned from the foregoing description that in the flexible display provided in this embodiment of this application, a suspended area below the polarizer layer 140 is filled with the adhesive covering layer 120, and the adhesive covering layer 120 is also bonded to the polarizer layer 140 through the pressure-sensitive adhesive layer 130. Therefore, a bonding area between the polarizer layer 140 and the layer structures (the adhesive covering layer 120 and the encapsulation layer 190) below the polarizer layer 140 is increased. In addition, the edge of the polarizer layer 140 is also bonded to the layer structures below the polarizer layer 140, so that when the polarizer layer 140 is folded inward, the entire polarizer layer 140 in the bending area receives an approximately equal stress. Therefore, the layer structures can be reliably connected together, to alleviate detachment between layers, and improve reliability of the flexible display.

Still refer to FIG. 4. During disposing of the adhesive covering layer 120, the adhesive covering layer 120 shown in FIG. 4 extends to the substrate 110. However, during specific disposing, it is not specifically limited whether the adhesive covering layer 120 extends to the substrate 110. In the flexible display provided in this embodiment of this application, the adhesive covering layer 120 may be alternatively disposed only on the part of the first data line layer 151 exposed outside the encapsulation layer 190. In a specific implementation solution, an edge of the adhesive covering layer 120 may be flush with the edge of the polarizer layer 140, so that the edge of the polarizer layer 140 can be fixedly connected to the adhesive covering layer 120, to improve stability of a connection between the polarizer layer 140 and another layer structures.

Figure 5:
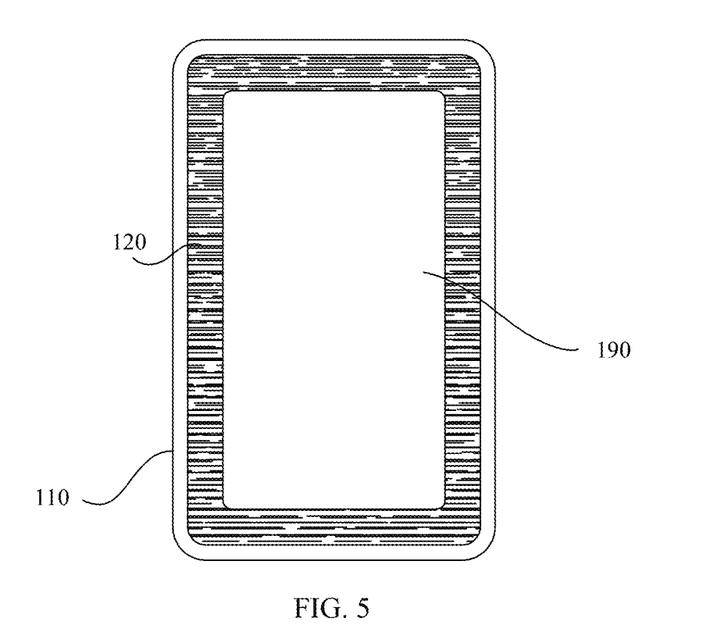
FIG. 5 is a top view of an adhesive covering layer in a flexible display according to an embodiment of this application.

FIG. 5 is a top view of the encapsulation layer and the adhesive covering layer. During disposing of the adhesive covering layer 120, the adhesive covering layer 120 is disposed in a ring-shaped manner. As shown in FIG. 5, in a direction from the display area to the non-display area, the adhesive covering layer 120 is located on an outer side of the encapsulation layer 190, the adhesive covering layer 120 uses a ring-shaped structure, and the adhesive covering layer 120 is disposed in a manner of surrounding the encapsulation layer 190, to wrap the adhesive covering layer 120 around the encapsulation layer 190. Refer to FIG. 4 together. When the polarizer layer 140 is disposed, the edge of the polarizer layer 140 is bonded to the disposed adhesive covering layer 120, to improve stability of the edge area of the polarizer layer 140.

Figure 6:
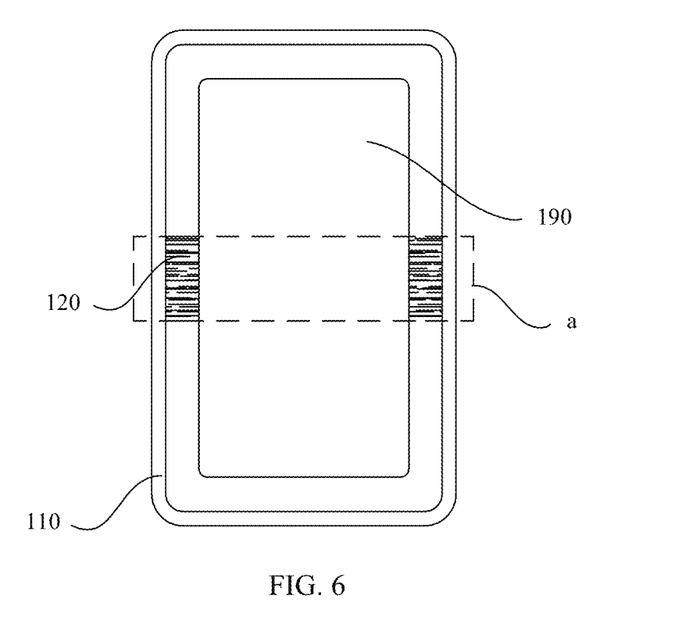
FIG. 6 is a top view of another adhesive covering layer in a flexible display according to an embodiment of this application.
Figure 7:
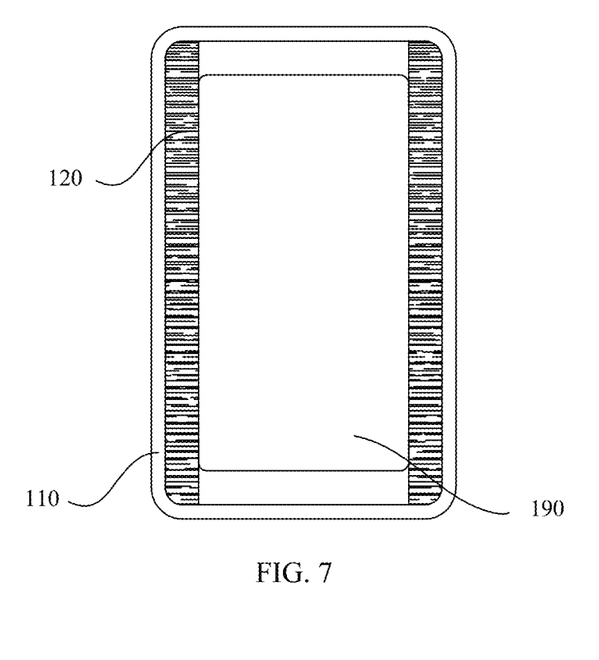
FIG. 7 is a top view of a third adhesive covering layer in a flexible display according to an embodiment of this application.

Certainly, it should be understood that FIG. 5 merely illustrates an example of a specific manner of disposing the adhesive covering layer 120. In this embodiment of this application, the adhesive covering layer 120 is not limited to being disposed in the manner shown in FIG. 5, and the adhesive covering layer 120 may be alternatively disposed only in the bending area of the flexible display. An area indicated by a dashed box in FIG. 6 is the bending area a corresponding to the flexible display. During disposing of the adhesive covering layer 120, the adhesive covering layer 120 may be disposed only in a location of the dashed box in FIG. 6. In this case, the adhesive covering layer 120 includes two segments, and the two segments of the adhesive covering layer 120 are separately disposed on two opposite sides of the encapsulation layer 190. In addition, the adhesive covering layer may be alternatively disposed in a manner shown in FIG. 7. The adhesive covering layer 120 shown in FIG. 7 may extend along a length of the adhesive covering layer 120 in FIG. 6, and the two segments of the adhesive covering layer 120 are respectively disposed in locations of two sides perpendicular to a bending axis in the flexible display. Certainly, the adhesive covering layer may be alternatively disposed in another manner. However, it should be understood that regardless of the disposing manner, at least the adhesive covering layer is disposed in the bending area of the flexible display, to ensure that the edge of the polarizer layer can be bonded and fastened through the adhesive covering layer 120 when the polarizer layer is bent.

An embodiment of this application further provides a flexible display. The flexible display is applied to an electronic device that can be folded inward. Being folded inward means that the flexible display is not exposed outside the electronic device after the electronic device is folded. For details, refer to related descriptions in FIG. 1 and FIG. 2. During specific disposing of the flexible display, the flexible display includes a plurality of layer structures, for example, a substrate, a first layer structure, a second layer structure, a third layer structure, a fourth layer structure, and a fifth layer structure. The foregoing layer structures may be layer structures having different functions in the flexible display. Detailed description is provided below.

The flexible display may be divided into a display area and a non-display area based on division of a display function. During disposing of the flexible display, the flexible display further includes a first layer structure and a second layer structure that are disposed in the non-display area. The first layer structure and the second layer structure are disposed on the substrate, and the first layer structure and the second layer structure may be different functional layers in the non-display area. As shown in FIG. 4, the first layer structure may be the data line layer 150, and the second layer structure may be the metal layer 160. During specific disposing of the first layer structure, the first layer structure includes two parts. The two parts are respectively a first structure disposed at a same layer as the second layer structure and a second structure stacked on the second layer structure. For example, the first layer structure is the data line layer 150. Then, the first structure is the first data line layer 151, and the second structure is the second data line layer 152. Refer to FIG. 4. The first structure is connected to the second structure, and the first structure and the second structure are located at different layers. Therefore, the first structure and the second structure form a step structure.

In addition, the flexible display further includes a third layer structure, and the third layer structure covers the second structure and a first part of the first structure. In FIG. 4, the third layer structure is the encapsulation layer 190, and the encapsulation layer 190 covers the second structure and the first part of the first structure. The flexible display provided in this embodiment of this application further includes a fourth layer structure. The fourth layer structure is disposed at a same layer as the third layer structure, and covers a second part of the first structure. The flexible display shown in FIG. 4 is used as an example. The fourth layer structure is the adhesive covering layer 120. During specific disposing of the fourth layer structure, the fourth layer structure not only covers the second part of the first layer structure, but also extends beyond the second part of the first layer structure to cover the substrate 110. When at least two isolation dams 1511 arranged at intervals are disposed on the first layer structure, the fourth layer structure covers the at least two isolation dams 1511.

Refer to FIG. 5 together. In a direction from the display area 102 to the non-display area 101, the fourth layer structure is located on an outer side of the third layer structure, the fourth layer structure is ring-shaped, and the fourth layer structure is disposed in a manner of surrounding the third layer structure to be wrapped around the third layer structure.

Still refer to FIG. 4. It can be learned from FIG. 4 that during disposing of the third layer structure and the fourth layer structure, a step formed by the first layer structure is filled by using the fourth layer structure and the third layer structure. In addition, a side that is of the fourth layer structure and that is away from the substrate 110 is approximately flush with a side that is of the third layer structure and that is away from the substrate 110, so that the third layer structure and the fourth layer structure have a flatting effect, to facilitate disposing of the fifth layer structure of the flexible display. Being approximately flush means that a height difference between the side that is of the fourth layer structure and that is away from the substrate 110 and the side that is of the third layer structure and that is away from the substrate 110 ranges from 0 µm to 5 µm. During specific disposing of the fourth layer structure, thickness of the fourth layer structure ranges from 1 µm to 10 µm, for example, is 1 µm, 3 µm, 5 µm, 7 µm, 8 µm, or 10 µm.

Still refer to FIG. 4. In FIG. 4, the fifth layer structure is the polarizer layer 140. During specific disposing of the fifth layer structure, the fifth layer structure covers the third layer structure and the fourth layer structure, and the fifth layer structure is separately fixedly connected to the third layer structure and the fourth layer structure. In FIG. 4, the fifth layer structure is bonded to the third layer structure and the fourth layer structure through the pressure-sensitive adhesive layer 130. During bonding, an outer edge area of the fifth layer structure is fixedly connected to an outer edge area of the fourth layer structure, to enhance strength of a connection between the fourth layer structure and the edge of the fifth layer structure.

It can be learned from the foregoing description that during disposing of the fifth layer structure, the disposed fourth layer structure and third layer structure cooperate to form a flat area, and the fifth layer structure may be separately fixedly connected to the third layer structure and the fourth layer structure, so that a part that is of the fifth layer structure and that is located in the non-display area can be stably fastened to another structure of the flexible display. When the flexible display is folded inward for a plurality of times, reliable connections between the fifth layer structure and both of the third layer structure and the fourth layer structure alleviate a warpage status of the fifth layer structure after the flexible display is bent for a plurality of times, and improve reliability of the flexible display.

In addition, an embodiment of this application further provides an electronic device. The electronic device may be different products, for example, a common electronic device such as a mobile phone, a PDA, a notebook computer, or a tablet computer. The electronic device is an electronic device that can be folded inward, and the flexible display is a flexible display that can be folded inward. The electronic device includes a structure shown in FIG. 1: the first housing 200, the rotating shaft mechanism 400, the second housing 300, and the flexible display 100 fastened to the first housing 200 and the second housing 300. Still refer to FIG. 1. The rotating shaft mechanism 400 is separately connected to the first housing 200 and the second housing 300. Rotation of the rotating shaft mechanism 400 enables the first housing 200 and the second housing 300 to rotate relative to each other. The flexible display 100 covers the first housing 200, the second housing 300, and the rotating shaft mechanism 400, and is separately bonded to the first housing 200 and the second housing 300 or connected to the first housing 200 and the second housing 300 in another manner. During use, the electronic device includes two states: an unfolded state and a folded state. When the electronic device shown in FIG. 1 is unfolded, the first housing 200 and the second housing 300 are separately expanded on two sides of the rotating shaft mechanism 400. In this case, the flexible display 100 is unfolded. During bending, the first housing 200 and the second housing 300 rotate relative to the rotating shaft mechanism 400, to form a state shown in FIG. 2 after folding. The first housing 200 and the second housing 300 are stacked oppositely, the flexible display 100 is bent along with the first housing 200 and the second housing 300, and the flexible display is not exposed outside the electronic device after being folded. However, because the flexible display is formed by stacking a plurality of layer structures inside the flexible display, when the flexible display is folded, the disposed fourth layer structure and third layer structure cooperate to form a flat area, and the fifth layer structure may be separately fixedly connected to the third layer structure and the fourth layer structure, so that a part that is of the fifth layer structure and that is located in the non-display area can be stably fastened to another structure of the flexible display. When the flexible display is folded inward for a plurality of times, reliable connections between the fifth layer structure and both of the third layer structure and the fourth layer structure alleviate a warpage status of the fifth layer structure after the flexible display is bent for a plurality of times, and improve reliability of the flexible display.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A flexible display comprising:
a display area and a non-display area;
a first layer structure and a second layer structure that are disposed in the non-display area, wherein
the first layer structure comprises a first structure, located at a same layer as the second layer structure, and comprises a second structure stacked on the second layer structure, and the first structure and the second structure form a step structure;
a third layer structure covering the second structure and a first part of the first structure;
a fourth layer structure disposed at a same layer as the third layer structure, and covering a second part of the first structure; and
a fifth layer structure covering the third layer structure and the fourth layer structure, and connected to the third layer structure and the fourth layer structure;
wherein the first layer structure is a data line layer, the second layer structure is a metal layer, the third layer structure is an encapsulation layer, and the fifth layer structure is a polarizer layer.

2. The flexible display according to claim 1, wherein the fourth layer structure is located on an outer side of the third layer structure.

3. The flexible display according to claim 2, wherein the fourth layer structure is ring-shaped, and the fourth layer structure is disposed surrounding the third layer structure.

4. The flexible display according to claim 1, wherein the flexible display comprises a substrate, and the first structure of the first layer structure is disposed on the substrate; and
the fourth layer structure extends beyond the second part of the first structure to cover the substrate.

5. The flexible display according to claim 1, wherein an outer edge area of the fifth layer structure is connected to an outer edge area of the fourth layer structure.

6. The flexible display according to claim 1, wherein a thickness of the fourth layer structure ranges from 1 μm to 10 μm.

7. The flexible display according to claim 1, wherein two isolation dams arranged at an interval are disposed on the first structure, and the fourth layer structure covers the two isolation dams.

8. The flexible display according to claim 1, wherein the flexible display further comprises a pressure-sensitive adhesive layer, and the fifth layer structure is bonded to the third layer structure and the fourth layer structure through the pressure-sensitive adhesive layer.

9. The flexible display according to claim 1, wherein the fourth layer structure is an adhesive covering layer.

10. An electronic device, comprising:
a first housing and a second housing that is rotatably connected to the first housing, and further comprising a flexible display, wherein the flexible display covers the first housing and the second housing, wherein the flexible display is connected to the first housing and the second housing; wherein the flexible display comprises a display area and a non-display area;
wherein the flexible display further comprises a first layer structure and a second layer structure that are disposed in the non-display area, wherein the first layer structure comprises a first structure located at a same layer as the second layer structure and a second structure stacked on the second layer structure; and
wherein the first structure and the second structure form a step structure;
wherein the flexible display further comprises a third layer structure, a fourth layer structure, and a fifth layer structure, wherein the third layer structure covers the second structure and a first part of the first structure;
wherein the fourth layer structure is disposed at a same layer as the third layer structure, and covers a second part of the first structure;
wherein the fifth layer structure covers the third layer structure and the fourth layer structure, and is connected to the third layer structure and the fourth layer structure; and
wherein the first layer structure is a data line layer, the second layer structure is a metal layer, the third layer structure is an encapsulation layer, and the fifth layer structure is a polarizer layer.

11. The electronic device according to claim 10, wherein the electronic device is an electronic device that can be folded inward, and the flexible display is a flexible display that can be folded inward.

12. The electronic device according to claim 10, wherein the fourth layer structure is located on an outer side of the third layer structure.

13. The electronic device according to claim 12, wherein the fourth layer structure is ring-shaped, and the fourth layer structure is disposed surrounding the third layer structure.

14. The electronic device according to claim 10, wherein the flexible display comprises a substrate, and the first structure of the first layer structure is disposed on the substrate; and
the fourth layer structure extends beyond the second part of the first structure to cover the substrate.

15. The electronic device according to claim 10, wherein an outer edge area of the fifth layer structure is connected to an outer edge area of the fourth layer structure.

16. The electronic device according to claim 10, wherein a thickness of the fourth layer structure ranges from 1 μm to 10 μm.

17. The electronic device according to claim 10, wherein two isolation dams arranged at an interval are disposed on the first structure, and the fourth layer structure covers the two isolation dams.

18. The electronic device according to claim 10, wherein the flexible display further comprises a pressure-sensitive adhesive layer, and the fifth layer structure is bonded to the third layer structure and the fourth layer structure through the pressure-sensitive adhesive layer.

19. The electronic device according to claim 10, wherein the fourth layer structure is an adhesive covering layer.

\* \* \* \* \*